United States Patent [19]

Wolverton et al.

[11] Patent Number: 5,269,094

[45] Date of Patent: Dec. 14, 1993

[54] APPARATUS FOR PURIFYING WASTE WATER AND AIR IN AN INDOOR ENVIRONMENT

[76] Inventors: Billy C. Wolverton, 726 Pine Grove Rd.; John D. Wolverton, P.O. Box 411, both of, Picayune, Miss. 39466

[21] Appl. No.: 827,729

[22] Filed: Jan. 29, 1992

[51] Int. Cl.$^5$ ............................................. A01G 31/00
[52] U.S. Cl. .................................... 47/62; 47/79; 210/602
[58] Field of Search ............... 47/62, 63, 64, 59, 79; 210/602

[56] References Cited

U.S. PATENT DOCUMENTS

| | | | |
|---|---|---|---|
| 4,255,896 | 3/1981 | Carl | 47/62 |
| 4,669,217 | 6/1987 | Fraze | 47/64 |
| 5,054,233 | 10/1991 | Evans | 47/62 |
| 5,067,275 | 11/1991 | Constance | 47/62 |

FOREIGN PATENT DOCUMENTS

| | | | |
|---|---|---|---|
| 245312 | 2/1966 | Australia | 47/63 |
| 1080204 | 3/1955 | France | 47/64 |
| 424537 | 9/1974 | U.S.S.R. | 47/63 |

*Primary Examiner*—Henry E. Raduazo
*Attorney, Agent, or Firm*—Alexander F. Norcross

[57] ABSTRACT

An apparatus for purifying waste water in an indoor environment is a container for holding the waste water to be treated together with at least one liner for receiving and holding an individual removable pot in which grows a house plant in a planting medium, typically expanded clay particles. The design of the container sets a constant interior water level. The support for the pots and the design of the pots then established the depth into this water level to which the growing medium and root structure of the chosen purification plants is immersed. INterlocking lips between the pot and the apparatus seal against the escape of odor producing gasses. The apparatus thus permits a wide variety of chosen house or office plants to be used for biological water purification, providing optimum growth conditions for any chosen plant.

8 Claims, 4 Drawing Sheets

APPARATUS FOR PURIFYING WASTE WATER AND AIR IN AN INDOOR ENVIRONMENT

BACKGROUND OF THE INVENTION

This invention relates to the field of biologically active water purification systems using combinations of plants and microbial action, and to the physical construction of same.

It is known that biological pollution control systems can be of great effectiveness in purifying organic wastes within water. Typical systems are described in, for example, Wolverton, U.S. Pat. No. 4,959,084 disclosing an air pollution treatment facility flowing air through a waste water fluid and then flowing the combined fluid and pollutants through a combination of rocks, plants and microbes for purification.

U.S. Pat. No. 4,961,763 to Thompson, et al discloses an indoor air purifyer in which plants are embedded in a layer of soil above an air plenum.

U.S. Pat. No. 4,956,936 to Sprung discloses a plant based waste water purification apparatus for greenhouses.

U.S. Pat. No. 4,931,183 to Klien et al discloses a biologically active percolating filter for purification of water.

U.S. Pat. No. 4,902,311 to Dingfors et al discloses an air purification apparatus utilizing adsorption in a fluidizied bed filter medium.

U.S. Pat. No. 4,797,212, to von Nordenskjöld discloses a general areation based water purification apparatus.

SUMMARY OF THE INVENTION

This invention pertains to the field of waste water treatment apparatus, especially to apparatus for control and treatment of environmental pollution using house plants.

The apparatus of the current invention is designed to purify and recycle waste water inside buildings utilizing low light requiring house plants in addition to removing air polluting substances during this process. The ability of house and office plants to remove indoor air polluting chemicals from sealed chambers is now recognized. Such plants are of particular benefit as they require significantly less light and space than those plants utilized in typical outdoor biological treatment facilities.

In such outdoor and industrial treatment facilities aquatic plants are utilized for biological purification; such plants can be completely submerged in water. House and office plants can be used for such purification, and require less light and space, but most house plants will not live when their roots are completely submerged in water. Typically house plants are planted in individual containers which are filled with some planting medium, typically a clay. These containers are supplied with a limited water supply to keep the roots and planting medium moist.

The inventive apparatus is a container for holding the waste water to be treated together with a liner for receiving and holding an individual removable pot in which grows a house plant in a planting medium, typically expanded clay particles. The design of the container sets a constant interior water level. The support for the pots and the design of the pots then established the depth into this water level to which the growing medium and root structure of the chosen purification plants is immersed. INterlocking lips between the pot and the apparatus seal against the escape of odor producing gasses. The apparatus thus permits a wide variety of chosen house or office plants to be used, providing optimum growth conditions for any chosen plant.

It is thus an object of the invention to provide a structure for treating and purifying waste water in an indoor environment.

It is a further object of the invention to show an apparatus which adapts to a variety of indoor plants for treatment of waste water and pollution.

It is a further object of the invention to provide an apparatus which is aesthetically pleasing, yet will treat and reduce water and air pollution.

It is a further object of this invention to show an apparatus which optimizes the purification of air and water by the combined effect of house plant leaves, roots, and associated microbial action.

These and other objects of the invention may be more clearly seen from the detailed description of the invention which follows.

DETAILED DESCRIPTION OF THE PREFERRED EMBODIMENT

Figure 1:
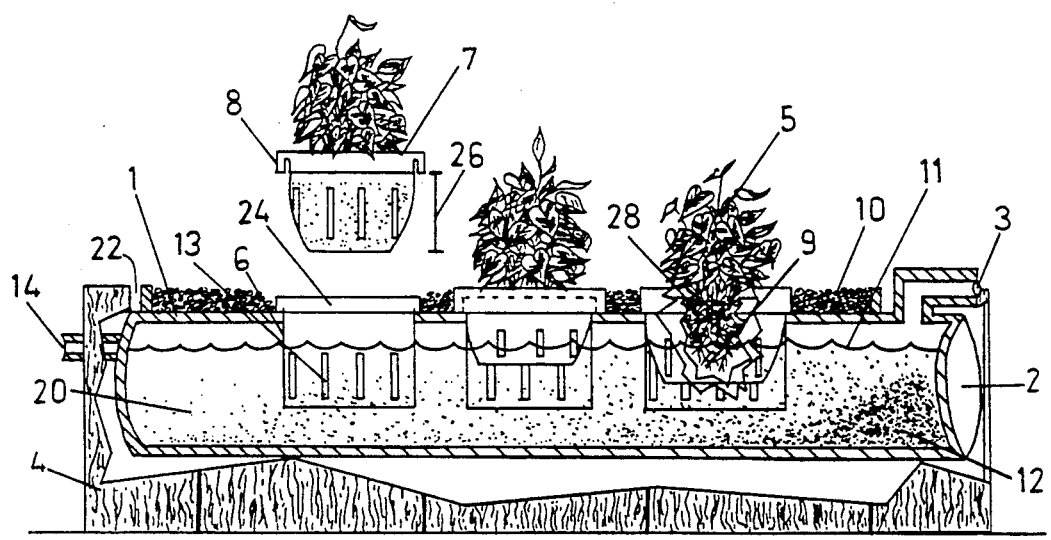
FIG. 1 is a side view of a first embodiment of the invention, utilizing a closed sludge chamber.
Figure 2:
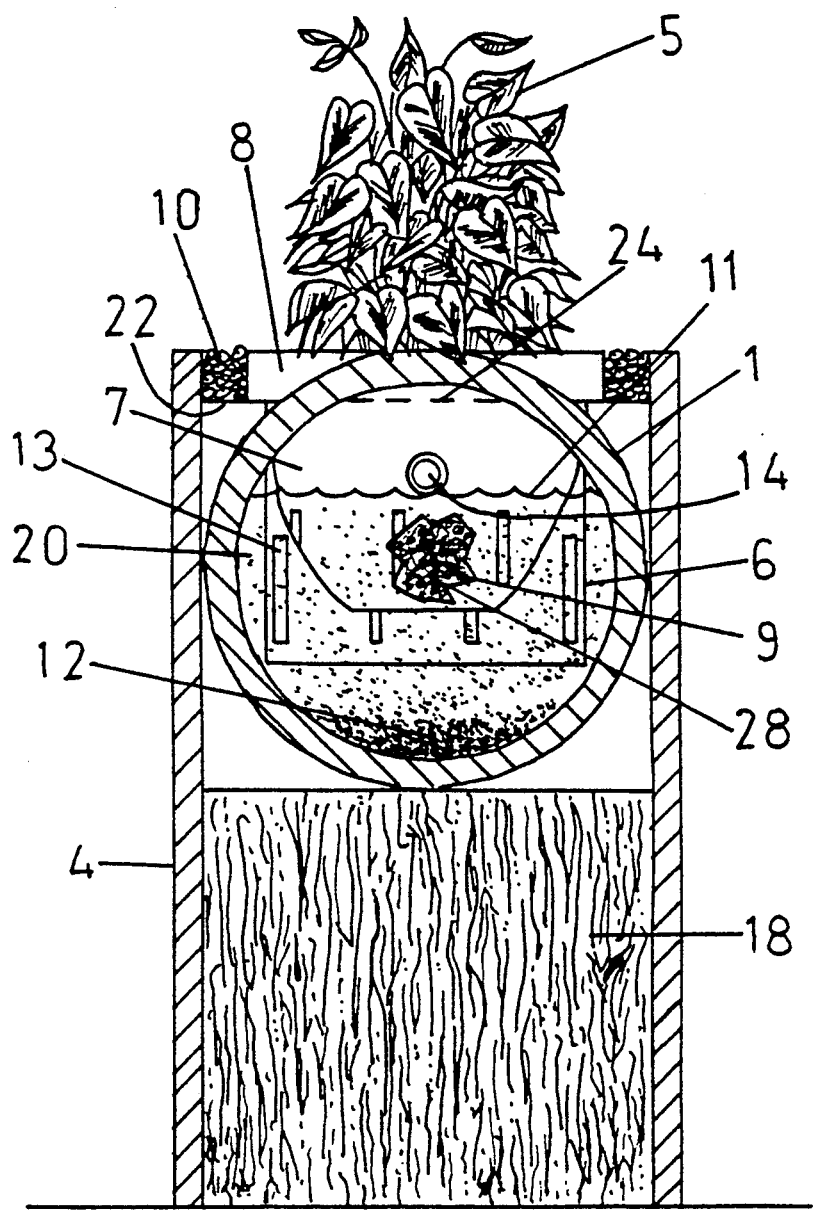
FIG. 2 is an end view of the first embodiment of the invention, utilizing a closed sludge chamber.
Figure 3:
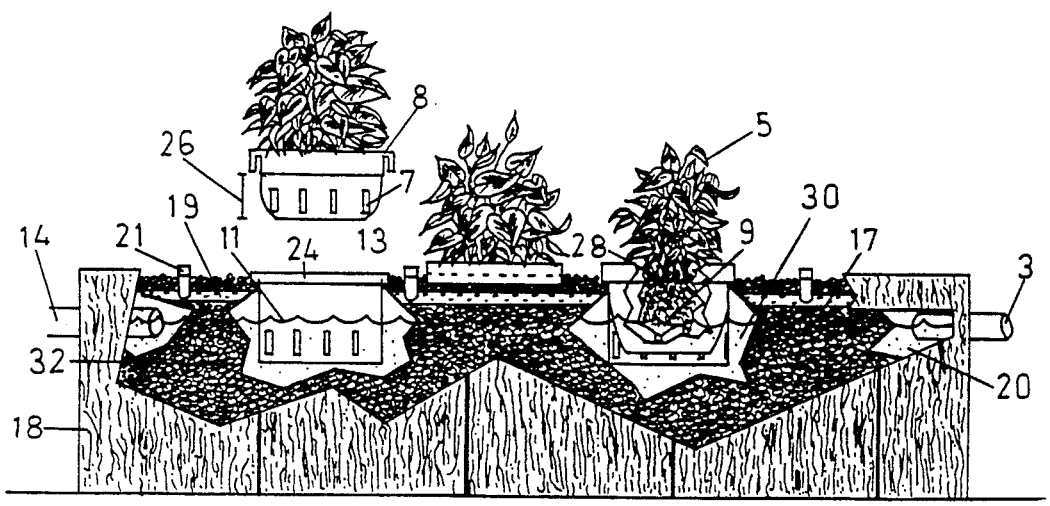
FIG. 3 is a side view of a second embodiment of the invention, utilizing an open treatment trough.
Figure 4:
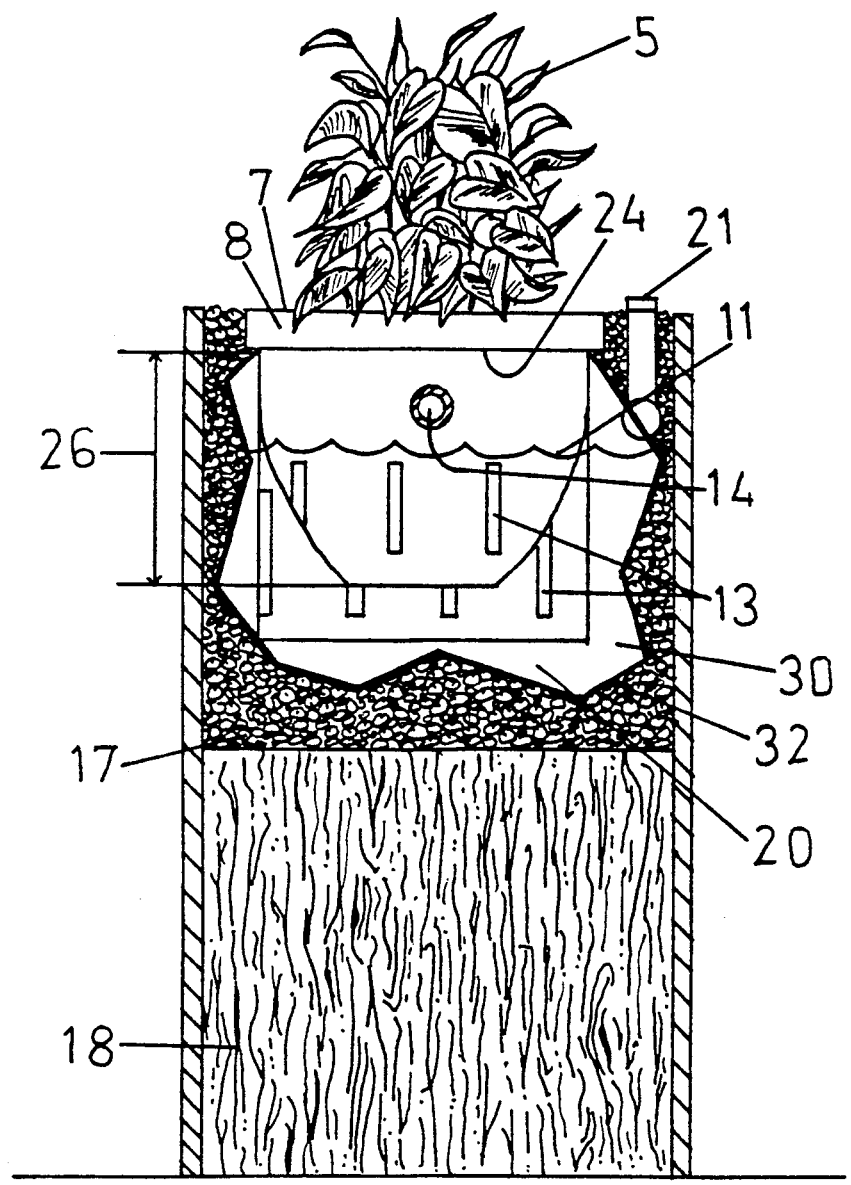
FIG. 4 is an end view of the second embodiment of the invention, utilizing an open treatment trough.

Referring to the figures, I show a form of the inventive apparatus for supporting and growing a plurality of plants for purification of indoor waste water.

The apparatus is based on a sludge chamber which contains the waste water to be treated. This sludge chamber 1 may be in the form of an enclosed concrete or plastic trough, with an enclosed upper surface, or it may be composed of a length of plastic pipe with closed ends 2, in the form of sealed water tight caps to form a closed chamber for holding waste water. In any case sludge chamber 1 forms a closed chamber for holding a wastewater influent 12, which is conveniently piped into the chamber 1 through an influent pipe 3.

An effluent pipe 14 provides for removal of treated wastewater from the sludge chamber. Effluent pipe 14 is mounted in the side or end cap 2 of the sludge chamber 1, and as a drain, establishes a water level 11 for the waste water 20 within the sludge chamber, by draining off excess wastewater if the water level rises above the desired level 11.

The orientation of the sludge chamber 1 defines an upper surface 22 of the sludge chamber. set into this upper surface 22 are a plurality of pot liners 6. Each pot liner 6 is a substantially cylindrical structure, having an upper lip 24 which extends above the upper surface of the sludge chamber 1; upper lip 24 forms a gas tight seal for the pot liner 6 against the sludge chamber 6, preventing escape of odors from between the liner 6 and the sludge chamber upper surface 22. Each pot liner 6 extends down into the sludge chamber 1 to a depth past the water level 11 in the sludge chamber 1. Within each pot liner are passages 13 to permit free flow of waste water from the sludge chamber 1 into the interior of the pot liner 6. These passages 13 are preferably totally located below water level 11 so that waste water will flow into the liner, but gasses and odors above the water level 11 will be trapped in the sludge chamber and will not flow into the pot liner 6.

Each pot liner 6 is of a uniform depth, designed to be deeper than any chosen pot 7. As has been described, treatment and purification of the waste water 20 is a biological process which occurs in the root structure of many house plants 5 and in the soil or planting medium surrounding these plants. Suitable house plants include but are not limited to peace lily, areca palm, lady palm, parlor palm, syngonium, ficus, chinese evergreen, ivy, mother-in-law's tongue, etc. Each of these plants has beneficial water purification capabilities; each however differs in the amount of water it will tolerate, the percentage moisture in the roots that it will survive, and its requirement for light and air. Further some plants grow strongly preferentially towards the light, and will thus develop a bias or unsymmetrical growth pattern, if planted in a fixed position.

Therefore, in this invention, the plants are not fixed planted in the sludge chamber directly, but rather in intermediate pots 7 which may be sealingly fit into the pot liners 6 to form a sealed, biologically active water treatment. A variety of pots 7 are provided, each having a uniform sized upper lip 8 which inter engages with the upper lip 24 of the pot liner 6 to form a seal against the escape of gasses from between pot 7 and pot liner 6; the pots are however of differing depths 26. Within each pot 7 is a growing medium 28, preferably expanded clay, which has desirable water transport qualities, within which grows the root structure 9 of a chosen water purifying plant 5. Each pot 7 has passages 13 in the base of the pot 7 to permit the free flow of water into the interior of the pot 7.

Each such chosen plant 5 has a preferred soil and root moisture. Optimum conditions for the chosen plant are assured by varying the depth 26 of the pot 7 so that the base of the pot 7 is inserted into the water level 11 only so far as to insure adequate watering of the plant root 9. Some plants 5 require very wet roots 9 and such plants 5 will be planted in pots 7 having a relatively great depth 26, so that much of the root structure 9 is at or below the water level 11. Water 20 flows freely through the passages 13 in liner 6 and pot 7 to saturate the growing medium 28 around the roots 9.

Other plants 5 require much less water; for such plants a shallower pot 7 is provided, as a result of which most of the growing medium 28 and root structure 9 is above the water line 11. The growing medium, especially the recommended expanded clay, is sufficiently hygroscopic that sufficient water will flow by capillary action to the root structure 9 of the plant 5. The expanded clay growing medium 28 is a particulate medium; in such a shallower pot, significant air can flow through the upper levels of the growing medium, and this air will be exposed to biological reactions, occurring incident to the growth of the root structure 9, which can purify the air. Such air purification can be enhanced by providing for certain passages 13 in the pot liners 6 and pots 7 to optionally be above the level 11 of the waste water 20 to permit odor bearing gasses to pass from the sludge chamber into the pot 7.

Further sealing of the pots 7 into the pot liners 6 can be accomplished by placing a layer 10 of expanded clay around the outer portion of the pot lips 8, covering the upper surface 22 of the sludge chamber 1. Where gasses are induced into the pots 7 for treatment as set forth above, this layer 10 of expanded clay can contain, buried in the expanded clay, a perforated pipe 19 which connect to suction caps 21 for applying suction for rapid filtration of contaminated air in the house. This use of the layer 10 of expanded clay on the upper surface of the sludge chamber 1 may be enhanced by mixing in additional gas filtration materials such as activated charcoal 20.

The entire apparatus may be encased in a decorative outer cover 4 to provide an attractive appearance.

In an alternative form of the invention, the wastewater is contained in an open treatment trough 18, which may be formed of concrete, fiberglass, or other water impermeable structural material. The trough 18 is filled with a particulate treatment medium, such as particulate expanded clay 17. Periodically a porous liner 32 creates water filled basins 30 into which pot liners 6 are set. Again, the lip 24 of the pot liners 6 is sealed, to the porous liner 32, to prevent outgassing of odor producing gasses 34. Although there is no closed upper surface to the trough in this embodiment, odor release from waste water in the trough is not a problem, as the gasses are reduced by biological action in the expanded clay fill 17 in the trough 18. This action is enhanced by bacterial migration from the plant root structure 9 through the waste water 20 into the clay fill 17. Again, an optional odor filter medium such as activated charcoal 20 may be added to the trough fill 17.

In addition to permitting optimum growing environment for various plants 5, the apparatus of the invention provides two other advantages from its structure of removable pots 7 and pot liners 6 for positioning the plants 5 in a wastewater treatment apparatus. First, the plants 5 are not fixed in position within the apparatus, but may be repositioned or rotated by movement of their pot 7. This permits plants 5 which are highly light sensitive to be rotated for even growth. Second, the biological processes of waste water purification may produce sludges 12 within the sludge chamber 1. While normally these sludges 12 are attacked by biological action resulting from the secondary bacterial associated with growth of the plant root structure 9, if it is desirable to remove an accumulation of sludge, this may be readily accomplished by removal of a plant pot 7 and its associated liner 6, permitting access to the interior of the sludge chamber for cleanout.

It can thus be seen that the invention provides for a flexible structure for supporting biologically active water purification plants in association with a supply of waste water for treatment, and through its flexibility in supporting various types of plants, is far more useful that a treatment apparatus with fixed planted plants. The invention thus extends beyond the two embodiments shown to that wider range of embodiments as are claimed.

I claim:

1. An indoor wastewater purification apparatus comprising:
   a sludge chamber having a water level defined therein;
   means for flowing wastewater into the sludge chamber, maintaining said waste water at said water level;
   a plurality of inner pot holder liners formed in an upper surface of said sludge chamber, extending down into said sludge chamber;
   said liners having passages for flow of waste water therethrough;

a removable pot, having passages for flow of waste water therethrough, insertable into said liner, an upper lip on said pot;

means for sealing said upper lip of said pot against said liner against passage of gasses.

2. The apparatus of claim 1 wherein;

said pot having a depth of immersion below said water level when said pot is inserted in said liner, said pot being sealed to said liner at said upper lip, whereby the depth of immersion of said pot is controlled by the depth of said pot.

3. The apparatus of claim 1 further comprising:

an open particulate wettable planting medium within said pot;

a wastewater purifing plant planted within said medium, said plant having an optimum water level within its planting medium;

said pot having a depth such that said plant optimum water level is equal to said sludge chamber water level when said pot is inserted into said liner.

4. The apparatus of claim 3, said pot depth being such that said planting medium is partly immersed in water and partly above water in air.

5. The apparatus of claim 1 further comprising:

a fill of particulate expanded clay within said pot;

a water purifing plant planted within said expanded clay, whereby a plant root structure extends down into said particulate expanded clay;

said pot having a depth such that said root structure is above said sludge chamber water level when said pot is inserted in said liner, water being conducted to said root structure by capilarry action through said particulate expanded clay, said roots being thereby exposed to both water and air.

6. The apparatus of claim 1, said means for sealing further comprising:

said pot having a lip circumferentially extending around an upper edge thereof;

said liner having a raised circular lip extending above the upper surface of the sludge chamber, said pot lip fitting circumferentially around said liner lip thereby sealing said pot into said liner against gas flow between said pot and said liner.

7. The apparatus of claim 6 wherein said seal further comprises:

a layer of particulate expanded clay pressed into conforming position around each said pot lip, covering the upper surface of said sludge chamber.

8. The apparatus of claim 1 further comprising:

a perforated pipe running along the exterior of said sludge chamber;

said pipe being covered by a layer of particulate expanded clay;

means for drawing air into said pipe and exhausting said air to an exterior location.

* * * * *